United States Patent
Watari

(10) Patent No.: US 12,093,257 B2
(45) Date of Patent: Sep. 17, 2024

(54) DATA PROCESSING DEVICE, DATA PROCESSING METHOD, AND DATA PROCESSING PROGRAM BASED ON A HISTORICAL PLAN TREE

(71) Applicant: NIPPON TELEGRAPH AND TELEPHONE CORPORATION, Tokyo (JP)

(72) Inventor: Yuya Watari, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/031,768

(22) PCT Filed: Oct. 15, 2020

(86) PCT No.: PCT/JP2020/038941
§ 371 (c)(1),
(2) Date: Apr. 13, 2023

(87) PCT Pub. No.: WO2022/079856
PCT Pub. Date: Apr. 21, 2022

(65) Prior Publication Data
US 2024/0020304 A1    Jan. 18, 2024

(51) Int. Cl.
*G06F 16/245* (2019.01)
*G06F 16/2453* (2019.01)

(52) U.S. Cl.
CPC .. *G06F 16/24544* (2019.01); *G06F 16/24539* (2019.01)

(58) Field of Classification Search
None
See application file for complete search history.

(56) References Cited

U.S. PATENT DOCUMENTS

| 2005/0240570 | A1 | 10/2005 | Ozbutun et al. |
| 2013/0086039 | A1* | 4/2013 | Salch ................ G06F 16/2455 707/E17.131 |
| 2014/0095471 | A1* | 4/2014 | Deshmukh ........ G06F 16/24568 707/714 |

(Continued)

FOREIGN PATENT DOCUMENTS

| JP | 2007534087 A | 11/2007 |
| JP | 2019040245 A | 3/2019 |

OTHER PUBLICATIONS

Roy et al. (2000) "Efficient and Extensible Algorithms for Multi Query Optimization" Proceedings of the 2000 ACMSIGMOD International Conference on Management of Data, SIGMOD '00, May, pp. 249-260.

*Primary Examiner* — Son T Hoang

(57) ABSTRACT

A data processing device includes: a recording unit (21) that records, as a history of a plan tree of each issued query, an execution result of the plan tree, a history of specific information for specifying each node of the plan tree, and an appearance frequency at which the plan tree has appeared in the past; and a cache reuse unit (25) that obtains specific information corresponding to an execution plan being executed, to refer to the history of the plan tree by using the obtained specific information as a key, and reuses the execution result of the plan tree of the obtained specific information when the obtained specific information exists.

14 Claims, 17 Drawing Sheets

(56) References Cited

U.S. PATENT DOCUMENTS

| | | | |
|---|---|---|---|
| 2015/0379083 A1* | 12/2015 | Lang | G06F 16/24532 |
| | | | 707/722 |
| 2017/0255673 A1* | 9/2017 | Li | G06F 16/24542 |
| 2019/0065551 A1 | 2/2019 | Morimoto et al. | |
| 2022/0100762 A1* | 3/2022 | Shiran | G06F 16/24537 |
| 2022/0114179 A1* | 4/2022 | Zheng | G06F 16/24524 |

* cited by examiner

| NODE | UNIQUE NUMBER |
|---|---|
| $e_1$ | 6 |
| $e_2$ | 0 |
| $e_3$ | 5 |
| $e_4$ | 2 |
| $e_5$ | 3 |
| $e_6$ | 7 |
| $e_7$ | 0 |
| $e_8$ | 1 |
| $e_9$ | 2 |
| $e_{10}$ | 3 |

Fig. 7

---
ALGORITHM 1 ACQUIRE ONE THAT MATCHES COLUMN FROM TARGET LIST
---

Input: e ← PLAN TREE, column ← COLUMN TO BE COMPARED
  function LookupColumn(e, column)
    for all t ∈ e.targetList do
      if Equals(e, t, column) then
        return t
      end if
    end for
    return null
  end function

Fig. 8

ALGORITHM 2 DETERMINE WHETHER ELEMENT t IN TARGET LIST AND COLUMN column ARE EQUAL Input: e ← PLAN TREE, ELEMENT IN TARGET LIST OF t ← e, column ← COLUMN TO BE COMPARED
function Equals(e, t, column)
  if t.tableNo IS REFERENCE TO CHILD NODE OF e then
    CHILD NODE INDICATED BY $e_{child}$ ← t.tableNo
    for all $t_2 \in e_{child}$.targetList do
      if Equals($e_{child}$, $t_2$, column) then
        return true
      end if
    end for
    return false
  else
    if t.tableNo = column.tableNo AND t.originalIndex = column.originalIndex then
      return true
    else
      return false
    end if
  end if
end function

Fig. 9

| ALGORITHM 3 REWRITE REFERENCE TO COLUMN |
|---|
| Input: e ← PLAN TREE<br>  function UpdateColumn(e)<br>    for all ALL COLUMNS REFERENCED BY column $\in$ e do<br>      column ← LookupColumn(e, column)<br>    end for<br>    for all CHILD NODE OF $e_{child}$ $\in$ e do<br>      UpdateColumn($e_{child}$)<br>    end for<br>  end function |

ALGORITHM 4 EXECUTE GIVEN NODE IN PLAN TREE AND RETURN TUPLE OF RESULT

---

Input: e ← PLAN TREE, cache ← TUPLE CACHE
  function ExecuteNode(e, cache)
    resultOfTryGet ← TryGet(e, e.index, cache)  ▷ resultOfTryGet IS PAIR OF (TRUTH VALUE, RESULT TUPLE)
    if resultOfTryGet.First then  ▷ First IS FIRST ELEMENT OF PAIR
      if e.index = 0 then
        IncrementCount(e, cache)
      end if
      e.index ← e.index + 1
      return resultOfTryGet.Second  ▷ Second is SECOND ELEMENT OF PAIR
    end if if e.eof then
      return null
    end if if e.frequency ≥ APPEARANCE FREQUENCY THRESHOLD then
      if e.index > 0 OR ReleaseCache(e) then
        result ← Execute(e)  ▷ Execute IS FUNCTION THAT EXECUTES NODE e AS USUAL
        if result = null then  ▷ WHEN RESULT TUPLE IS null, IT INDICATES THAT EXECUTION HAS BEEN COMPLETELY FINISHED
          e.eof ← true
          return null
        end if
        PutTuple(e, result, cache)
        e.index ← e.index + 1
        return result
      end if
    end if return Execute(e)
  end function

Fig. 12

| ALGORITHM 5 INSERT TUPLE INTO TUPLE CACHE |
|---|
| Input: e ← PLAN TREE, tuple ← TUPLE TO INSERT, cache ← TUPLE CACHE
function PutTuple(e, tuple, cache)
  if UNIQUE NUMBER e.id EXISTS IN cache.indexes then
    cache.array[cache.indexes[e.id]].tuples ← cache.array[cache.indexes[e.id]].tuples ⊕ {tuple}  ▷ ⊕ IS ADDITION TO END OF ARRAY
  else
    x ← emptyElement
    x.tuples ← {tuple}
    x.frequency ← 1
    cache.array ← cache.array ⊕ {x}
    cache.indexes[e.id] ← cache.array.length − 1  ▷ length IS LENGTH OF ARRAY cache.array
    HEAP cache.array
  end if
  cache.totalSize ← NUMBER OF BYTES OF cache.totalSize + tuple
end function |

Fig. 13

ALGORITHM 6 ACQUIRE TUPLE IF TUPLE EXISTS IN TUPLE CACHE

Input: e ← PLAN TREE, index ← INDEX OF TUPLE TO BE ACQUIRED NEXT, cache ← TUPLE CACHE
function TryGet(e, index, cache)
  if UNIQUE NUMBER e.id EXISTS IN e.indexes then
    return (true, cache.array[cache.indexes[e.id]].tuples[index])
  else
    return (false, null)
  end if
end function

ALGORITHM 7 DELETE UNNECESSARY CACHE FROM TUPLE CACHE

Input: e ← PLAN TREE, frequency ← APPEARANCE FREQUENCY OF NODE e ACQUIRED FROM ASSOCIATIVE ARRAY THAT RECORDS APPEARANCE FREQUENCY
function ReleaseCache(e, frequency)
   while ESTIMATED VALUE OF SIZE OF EXECUTION RESULT OF cache.totalSize+e > MEMORY CAPACITY ALLOCATED TO CACHE
   AND cache.array[0].frequency ≤ frequency do
     DELETE ALL TUPLES IN cache.array[0].tuples
     cache.totalSize ← cache.totalSize − SIZE OF DELETED TUPLE
     DELETE cache.array[0] FROM cache.array
     HEAP cache.array
   end while if ESTIMATED VALUE OF SIZE OF EXECUTION RESULT OF cache.totalSize+e ≥ MEMORY CAPACITY ALLOCATED TO CACHE
   then
     return true
   else
     return false
   end if
end function

Fig. 15

| ALGORITHM 8 INCREMENT APPEARANCE FREQUENCY OF PLAN TREES BY ONE |
|---|
| Input: e ← PLAN TREE, cache ← TUPLE CACHE<br>function IncrementCount(e, cache)<br>    cache.array[cache.indexes[e.id]].frequency ← cache.array[cache.indexes[e.id]].frequency + 1<br>    HEAP cache.array<br>end function |

DATA PROCESSING DEVICE, DATA PROCESSING METHOD, AND DATA PROCESSING PROGRAM BASED ON A HISTORICAL PLAN TREE

CROSS-REFERENCE TO RELATED APPLICATIONS

This application is a U.S. National Stage Application filed under 35 U.S.C. § 371 claiming priority to International Patent Application No. PCT/JP2020/038941, filed on 15 Oct. 2020, the disclosure of which is hereby incorporated herein by reference in its entirety.

TECHNICAL FIELD

The present invention relates to a data processing device, a data processing method, and a data processing program.

BACKGROUND ART

In the related art, a method for increasing the speed by sharing and executing common parts existing between a plurality of analysis queries has been proposed in a situation where the queries are issued in a batch in a database (see, for example, NPL 1).

Specifically, two queries, query $Q_1$ (see Expression (1)) and query $Q_2$ (see Expression (2)) are taken as examples. Both queries $Q_1$ and $Q_2$ are join operations between three tables, and have a join operation shown in Expression (3) as a common part. Note that A, B, C, and D indicate a table.

[Math. 1]

$$A \bowtie B \bowtie C \quad (1)$$

[Math. 2]

$$A \bowtie B \bowtie D \quad (2)$$

[Math. 3]

$$A \bowtie B \quad (3)$$

In this case, there is a likelihood that the query execution can be speeded up by executing the common part shown in Expression (3) only once, holding the result, and reusing the result in both queries. A technique for sharing and executing such a common part is called multiple query optimization. Multiple query optimization leads to reducing the execution time of the analysis query, and the method of NPL 1 describes that the query execution time is reduced to about half in the evaluation experiment.

Such a high-speed method is important in improving the degree of freedom in an analysis system. In an analysis system such as an analysis dashboard, there is a case in which a query that can be issued by a user is restricted in consideration of a response time to the user and the performance of the entire system. For the problem that limits the degree of freedom of analysis in this way, multiple query optimization is useful as a method for improving the performance of the database.

CITATION LIST

Non Patent Literature

[NPL 1] P. Roy, S. Seshadri, S. Sudarshan, and S. Bhobe, "Efficient and Extensible Algorithms for Multi Query Optimization," Proceedings of the 2000 ACM SIGMOD International Conference on Management of Data, SIGMOD '00, New York, NY, USA, ACM, pp. 249-260 (2000).

SUMMARY OF INVENTION

Technical Problem

The related art can only be applied to situations where a plurality of queries are issued at the same timing. This is because the related art assumes that the set of queries to be optimized is known. Therefore, the related art is available only in situations where a plurality of queries are given as a batch. In actual use cases of online analytical processing (OLAP), the number of queries issued at the same time tends to be smaller than in on-line transaction processing (OLTP), which focuses on transaction processing.

For example, when a user assembles queries through trial and error, similar queries are issued, but it is expected that the user will refine the queries on the basis of the execution result and issue the next query instead of issuing those queries at the same timing. In this way, similar queries often arrive with time differences in OLAP workloads. When the related art is applied to such a situation, execution of a preceding query has to be waited for until a subsequent query arrives, and there is a problem that a waiting time increases, and thus an application range of the related art is limited.

The present invention has been made in view of the above, and an object of the present invention is to provide a data processing device, a data processing method, and a data processing program capable of speeding up the execution time of all of queries.

Solution to Problem

In order to solve the above-mentioned problem and achieve the object, according to the present invention, there is provided a data processing device including: a recording unit that records, as a history of a plan tree of each issued query, an execution result of the plan tree, a history of specific information for specifying each node of the plan tree, and an appearance frequency at which the plan tree has appeared in the past; and a reuse unit that obtains specific information corresponding to an execution plan being executed, refers to the history of the plan tree by using the obtained specific information as a key, and reuses the execution result of the plan tree of the obtained specific information when the obtained specific information exists.

Advantageous Effects of Invention

According to the present invention, it is possible to execute a preceding query without causing a waiting time, and to realize the speeding-up of a subsequent query.

BRIEF DESCRIPTION OF DRAWINGS

FIG. 7 is a diagram showing Algorithm 1.

FIG. 8 is a diagram showing Algorithm 2.

FIG. 9 is a diagram showing Algorithm 3.

FIG. 10 is a diagram showing Algorithm 4.

FIG. 12 is a diagram showing Algorithm 5.

FIG. 13 is a diagram showing Algorithm 6.

FIG. 14 is a diagram showing Algorithm 7.

FIG. 15 is a diagram showing Algorithm 8.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

Embodiment

[1. Overview of Multiple Query Optimization]

Figure 1:
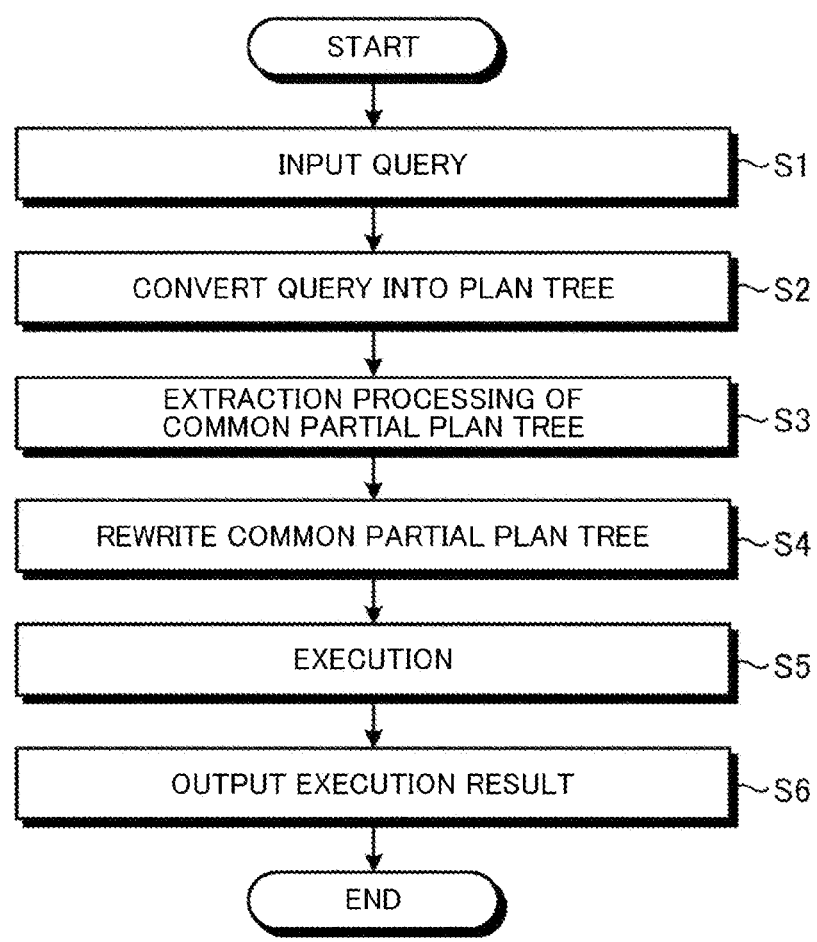
FIG. 1 is a flowchart showing a processing flow in multiple query optimization.
Figure 2:
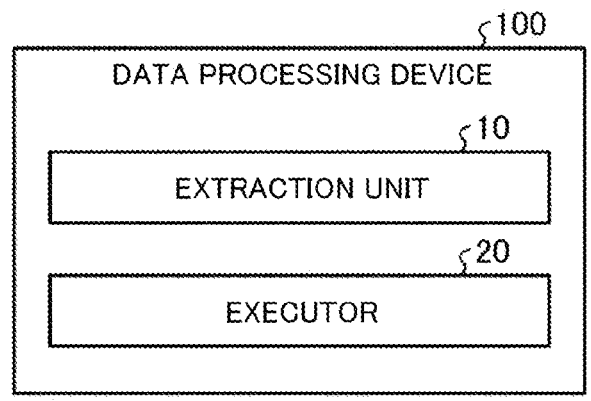
FIG. 2 is a block diagram showing an example of a configuration of a data processing device according to an embodiment.

First, an overview of multiple query optimization will be described. FIG. 1 is a flowchart showing a processing flow in multiple query optimization. FIG. 2 is a block diagram showing an example of a configuration of a data processing device according to an embodiment. As shown in FIG. 2, a data processing device 100 according to the embodiment includes an extraction unit 10 and an executor 20. The data processing device 100 is, for example, a relational database management system.

In the multiple query optimization, when a query is input (step S1), the query is converted into a plan tree (execution plan) generated by a planner among modules of a database (step S2). In the multiple query optimization, the extraction unit 10 extracts the same subtree among subtrees of the plan tree as a common partial plan tree (step S3), and rewrites the common partial plan tree (step S4). Subsequently, in the multiple query optimization, the plan tree is executed by the executor 20 (step S5), and the execution result is output (step S6). In the present embodiment, the execution part of the plan tree in the executor is speeded up.

[2. Definition of Plan Tree and Common Plan Tree]

In the present embodiment, by caching the intermediate result of the query in the memory in combination with the high-speed extraction of the common partial plan tree in step S3, the preceding query is executed without causing a waiting time, and the speeding-up of the subsequent query is realized.

In the present embodiment, a common partial plan tree is extracted at a high speed from plan trees of a plurality of queries. Here, the definitions of the plan tree and the common partial plan tree will be described.

Figure 3:
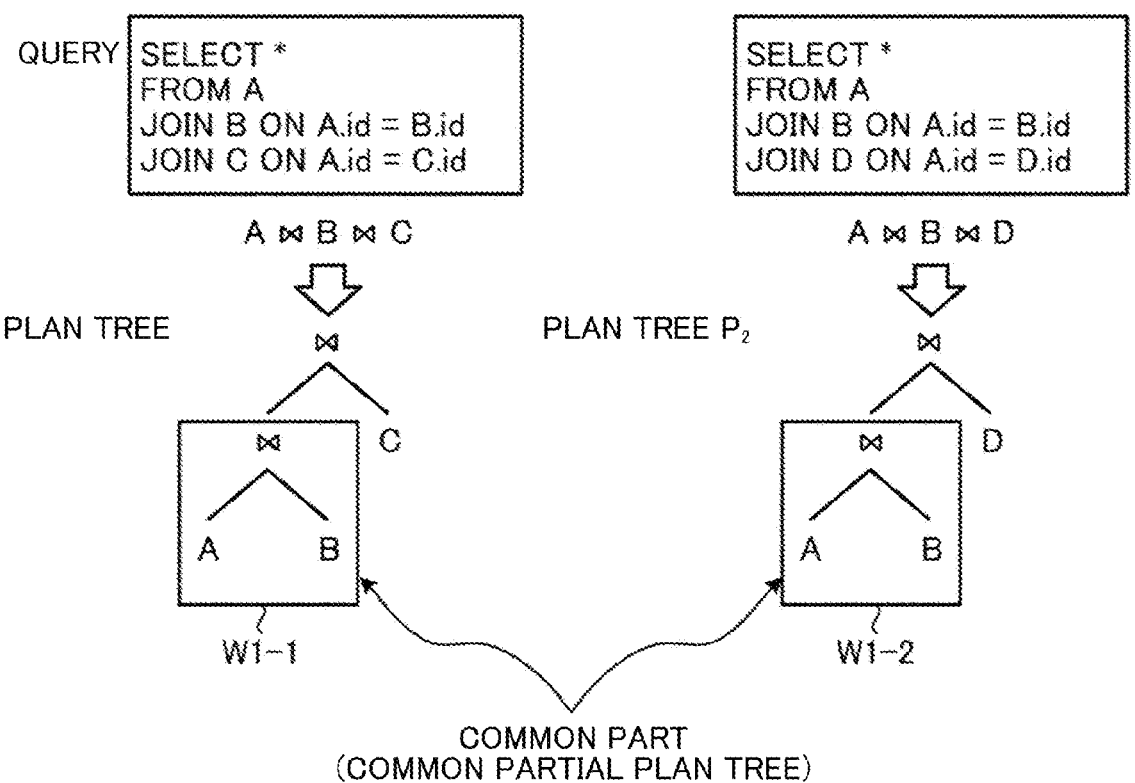
FIG. 3 is a diagram showing an example of a plan tree.

The plan tree is a tree structure representing an execution plan of a query generated by a planner of a database. FIG. 3 is a diagram showing an example of the plan tree. FIG. 3 shows a plan tree for two queries, query $Q_1$ (see Expression (4)) and query $Q_2$ (see Expression (5)).

[Math. 4]

$$A \bowtie B \bowtie C$$

[Math. 5]

$$A \bowtie B \bowtie D \quad (5)$$

A subtree is a tree that has a node in the plan tree as its root and is composed of all descendant nodes and edges under that node. When two subtrees are the same, it means that the trees have the same structure and the corresponding nodes in the structure have the same operation. When the same subtree appears a plurality of times in common, the subtree is called a common partial plan tree.

The common partial plan tree in FIG. 3 is a portion surrounded by frames W1-1 and W1-2, that is, a join operation shown in Expression (6).

[Math. 6]

$$A \bowtie B \quad (6)$$

[3. Extraction Unit]

In the present embodiment, the extraction unit 10 extracts a common partial plan tree, which is a common part of each plan tree, from the plan tree of each issued query, and assigns specific information to each node of the common partial plan tree. For example, the extraction unit 10 allocates a unique number (unique number) that does not duplicate the others to each node of the plan tree as specific information in the process of extracting the common partial plan tree from a plurality of queries. In other words, the extraction unit 10 assigns a unique number to each node of the plan tree of each issued query. This unique number is called a unique number.

The unique number has the same value only when the subtrees under the node are the same and only then. The data processing device 100 extracts a subtree composed of nodes having the same unique number as a common partial plan tree.

Then, the executor 20 caches the execution result (intermediate result of the query) of the common partial plan tree in a memory while utilizing the unique number, thereby allowing speeding up.

Figure 4:
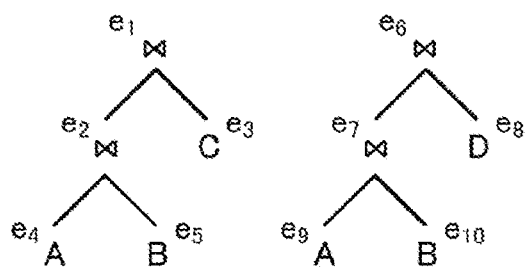
FIG. 4 is a diagram illustrating an example of a unique number of each node of two plan trees.

FIG. 4 is a diagram for describing an example of a unique number of each node of two plan trees. In FIG. 4, as an example, nodes corresponding to the join operation shown in Expression (6), which is the same plan tree as the plan tree shown in FIG. 3, that is, the unique numbers of nodes $e_2$ and $e_7$ have the same value. The child nodes of both nodes, node $e_4$ and node $e_9$, and nodes $e_5$ and $e_{10}$, also have the same unique number. When the unique numbers are the same, the execution results of the nodes become the same, and therefore the speed can be increased by caching.

[4. Executor]

Figure 5:
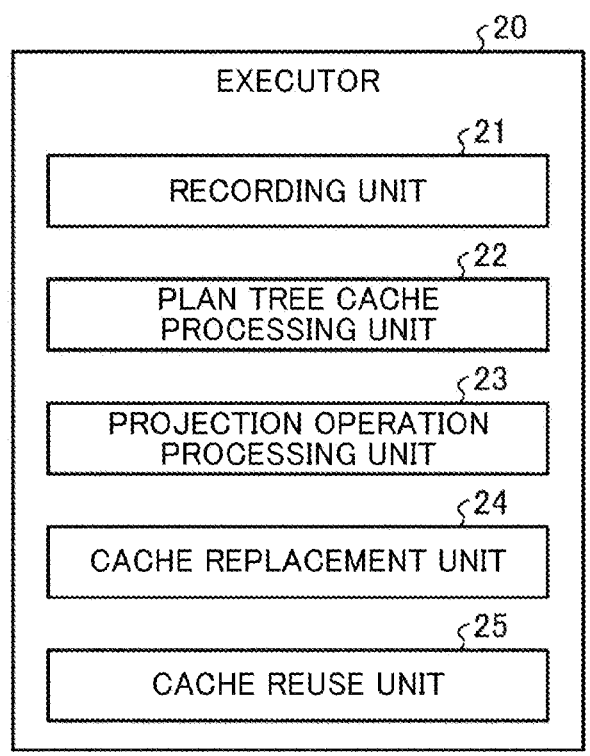
FIG. 5 is a block diagram showing an example of a configuration of an executor shown in FIG. 2.

Subsequently, the configuration of the executor 20 will be described. The executor 20 executes a plan tree and executes the plan tree. FIG. 5 is a block diagram showing an example of the configuration of the executor 20 shown in FIG. 2. FIG. 5 shows a function related to reuse of the execution result among the functions of the executor 20. As shown in FIG. 5, the executor 20 includes a recording unit 21, a plan tree cache processing unit 22 (cache processing unit), a projection operation processing unit 23, a cache replacement unit 24, and a cache reuse unit 25 (reuse unit).

The recording unit 21 records, as a history of the plan tree of each issued query, a history of a unique number assigned to each node of the plan tree and an appearance frequency at which the plan tree has appeared in the past.

The plan tree cache processing unit 22 refers to the history and appearance frequency of the unique numbers recorded in the recording unit 21, and caches a common partial plan tree that has appeared a number of times equal to or greater than a predetermined appearance frequency threshold among common partial plan trees that are plan trees having the same unique number.

The projection operation processing unit 23 rewrites and caches the plan tree so that all columns output by the operation of the common partial plan tree appear as a result.

When the capacity of the cache reaches a certain value, the cache replacement unit 24 discards the cache of the unnecessary common partial plan tree.

The cache reuse unit 25 obtains a unique number corresponding to the execution plan being executed, refers to the history of the plan tree by using the obtained unique number as a key, and reuses the execution result of the plan tree of the obtained unique number when the obtained unique number exists. Hereinafter, each functional unit will be described in detail.

[4.1. Recording Unit]

The recording unit 21 has a function of holding the history of the plan tree of the issued query and recording the appearance frequency thereof. In the present embodiment, the extraction unit 10 assigns a unique number to all the nodes in the plan tree of the query. The same unique number is a common partial plan tree, and the history of the unique numbers is held, so that the frequency at which the plan tree has appeared in the past can be ascertained. Therefore, the recording unit 21 records the appearance frequency of the plan tree by holding an associative array with the unique number of each node in the plan tree as a key and the appearance frequency of the plan as a value.

[4.2. Plan Tree Cache Processing Unit]

The executor 20 speeds up the query by caching the results of the plan tree (common partial plan tree) that has appeared a plurality of times and reusing them in subsequent queries. Here, it is not possible to cache all common partial plan trees because the resulting cache is costly.

Therefore, the plan tree cache processing unit 22 sets a threshold of a predetermined appearance frequency (hereinafter referred to as an appearance frequency threshold), and caches a common partial plan tree that has appeared a number of times equal to or greater than the appearance frequency threshold.

In the present embodiment, the behavior of the entire cache mechanism can be controlled by controlling the appearance frequency threshold. Specifically, since the common partial plan tree is positively cached by lowering the appearance frequency threshold, it is possible to increase sharing opportunities. On the other hand, since only the common partial plan tree appearing more frequently is cached by increasing the appearance frequency threshold, it is possible to reduce the case where the common partial plan tree is cached but not reused. The plan tree cache processing unit 22 controls the number of common partial plan trees to be cached in accordance with an increase or decrease the value of the appearance frequency threshold.

In actual workloads, there are those in which the common part is easy to arrive and those in which the common part is not easy to arrive. In the present embodiment, tuning by the user can be performed by setting the appearance frequency threshold to a value suitable for each workload. When it is determined that the common partial plan tree is to be cached by the above processing, the execution result is cached in the memory. The detailed algorithm of the cache will be described later in Section 5.

[4.3. Projection Operation Processing Unit]

Projection operations exist as a type of relational algebra operations in databases. In the executor 20, the projection operation processing unit 23 rewrites the projection operation.

Here, when the contents of the projection operation are different, the tuples of the intermediate results will be different. For example, even in the case of a join operation under the same condition between the same tables, when columns to be used are different, the projection operation is different, and the execution result is thus different. In this manner, the common partial plan trees that are the same except for the projection may exist, and in order to enable the cache even in such a situation, the projection operation processing unit 23 rewrites and caches the common partial plan trees so that all columns output by the operation of the common partial plan trees appear as a result.

Figure 6:
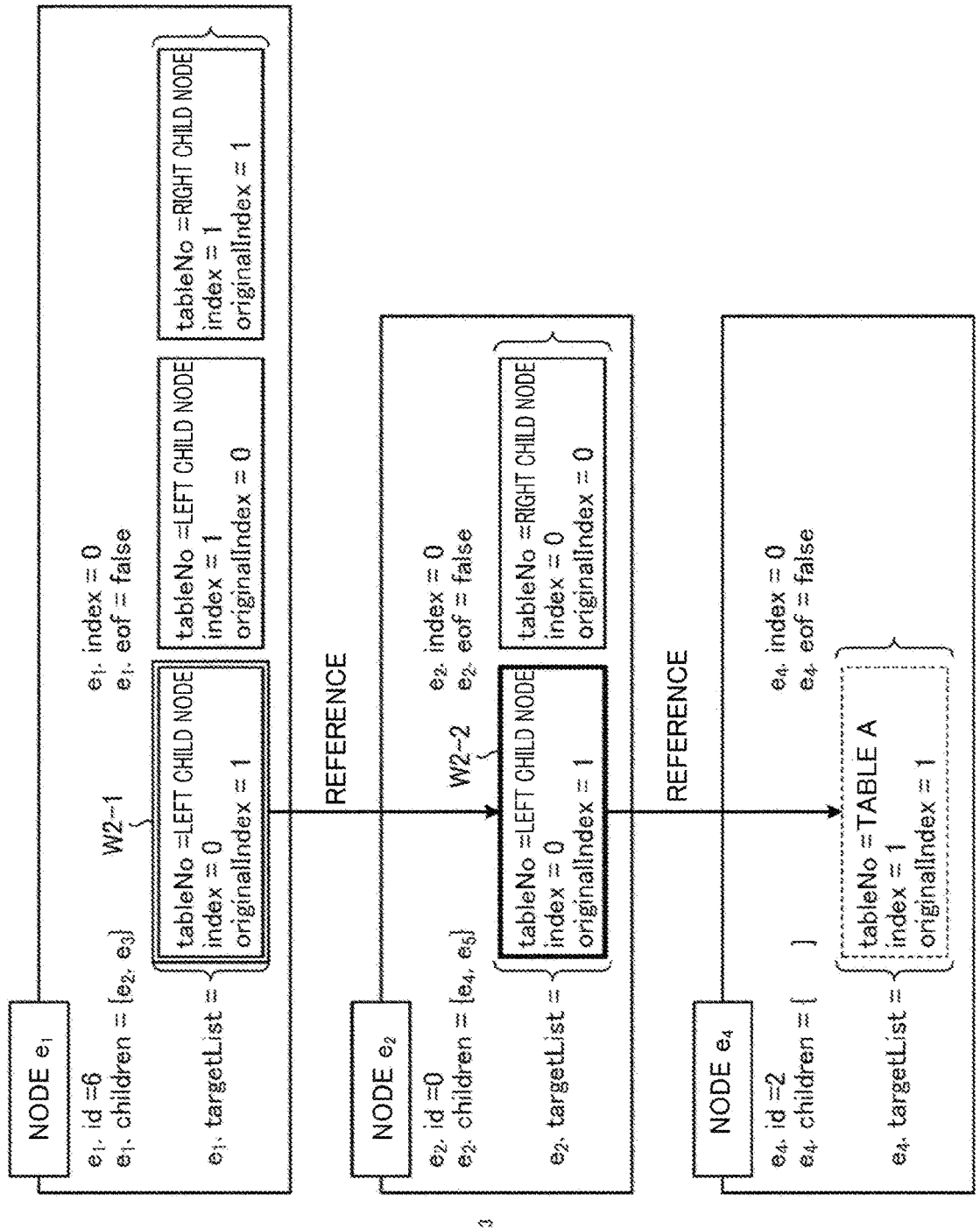
FIG. 6 is a diagram showing an example of a data structure of a node of a plan tree.

Hereinafter, the details of the projection operation processing will be described. First, the data structure of the plan tree on the database will be described. FIG. 6 is a diagram showing an example of the data structure of the node of the plan tree. Each node e shown in FIG. 6 has its own unique number e.id, a set of child nodes e.children, an index e.index of the tuple to be read next, an e.eof indicating whether the execution has reached the end, and a structure (hereinafter referred to as a target list) e.targetList representing a projection operation.

As shown in FIG. 6, the target list is an array having a reference to the column output by the plan tree as an element. Some of the elements of the target list shown in FIG. 6 are drawn by broken lines or double lines, but these elements are for convenience of explanation and are not distinguished from each other in the actual data structure.

Each element t of the target list has attributes of t.tableNo indicating from which table the column indicated by the element is output, and of t.index and t.originalIndex.

Here, when the node e is a table scan or the like, t.tableNo is a number uniquely allocated to the table, and when referring to the output result of the child node, t.tableNo is a special value that indicates which child node it is. t.index is an index indicating the number in the execution result of t.tableNo. t.originalIndex is a value indicating the number of the columns in the table corresponding to the leaf node (rather than the output of the intermediate node).

The target list will be described with reference to FIG. 6 as an example. First, focusing on the target list of node $e_1$, there are three elements here. This represents each column output by the node $e_1$. Of these, the first column, that is, in FIG. 6, the element in the frame W2-1 of the double line refers to the column whose index is 0 (that is, the first element) among the left child nodes of the node $e_1$.

Therefore, the output of the column is the column corresponding to the first element (see frame W2-2) of the target list of node $e_2$. Similarly, it can be seen that the column refers to the output of the column of index 1 of node $e_4$. Among the elements of the target list mentioned in the above description, originalIndex is consistently the same as index 1 in the node $e_4$.

Subsequently, the processing of the projection operation, that is, the rewriting of the target list will be described. The projection operation processing unit 23 first adds all columns to be output by the operation to the target list of the common partial plan tree. In the example of FIG. 6, the node $e_4$ outputs only the column of index 1, but an element is added to $e_4$.targetList so that other columns are also output. Similarly, reference to the added column is added to $e_2$ and $e_0$ which are the parent nodes.

Hereinafter, Algorithm 3 that updates the reference to the column with the rewriting of the target list and Algorithm 1 of a LookupColumn function called from Algorithm 3 will be described. This rewriting is performed when adding a column to the target list in caching and when reusing the cached result.

First, Algorithm 1 of the LookupColumn function will be described. FIG. 7 is a diagram showing Algorithm 1. This function is a function that returns the index number of the column in the target list when given the node and column in the plan tree.

The LookupColumn function scans the target list in sequence, and returns the elements when the elements in the target list are equal to the column. This determination of the equivalence is performed by an Equals function, and the algorithm is shown in Algorithm 2. FIG. 8 is a diagram showing Algorithm 2.

The element t in the target list is identified by t.tableNo and t.originalIndex. If this t.tableNo and t.originalIndex are both equal, the Equals function returns true. However, as described above, when referring to the output result of the child node, t.tableNo is a relative value indicating the child node. In this case, the target list of child nodes is recursively referred to. The above description is directed to the Equals and Lookupcolumn functions.

The projection operation processing unit 23 rewrites the target list so as to output all tuples at the time of caching. When the target list is rewritten, all parent nodes (including the node itself) that refer to the plan tree have to rewrite the reference to the column, that is, t.index. In other words, since the order of the output columns changes, an index of a reference destination differs.

In the example of FIG. 6, when one column is added to the head of the target list of the node $e_4$, the index in the frame W2-2 of the target list of the node $e_2$ has to be updated to 1. This rewriting is performed by an UpdateColumn function (algorithm shown in Algorithm 3). FIG. 9 is a diagram showing Algorithm 3.

As shown in FIG. 9, the UpdateColumn function starts from root node $e_{root}$ of the plan tree generated by the database and is recursively applied to the child nodes. In each node of the plan tree, there are references to columns at various locations in addition to the target list. Algorithm 3 scans all of them and calls the Lookupcolumn function to acquire an index of a correct reference destination, and rewrites the reference with the index.

[4.4. Cache Replacement Unit]

Since the size of the data that can be cached is limited, the cache replacement unit 24 discards the cache of the unnecessary common partial plan tree when the capacity of the cache reaches a certain value. Although some policies for discarding at this time can be considered, in the present embodiment, least frequently used (LFU) is employed.

In LFU, the cache of the common plan tree having a low appearance frequency is discarded. In this case, the common partial plan tree having a low appearance frequency is determined by using the queue with priority. The details of this algorithm (Algorithm 7) will be described later in Section 5.

[4.5. Cache Reuse Unit]

In the present embodiment, the cache reuse unit 25 refers to the cache at the time of execution, and if there is data in the cache, the cache is executed while reusing the data. At this time, the cache reuse unit 25 obtains a unique number corresponding to an execution plan being executed, refers to an associative array holding a cache by using the unique number as a key, and confirms whether the obtained unique number exists in the cache. If the unique number exists, the execution result of the common partial plan tree of the unique number is reused. The details of the algorithm will be described later in Section 5.

[5. Details of Algorithm]

Subsequently, the algorithm used by the executor 20 will be described.

The plan tree (execution plan) generated by the planner among the modules of the database is executed by an executor which is also one of the modules. At this time, the node of the plan tree is executed while recursively scanning from the root node, and the execution result is repeatedly returned to the parent node. In the present embodiment, the cache mechanism described in Section 4 is implemented by rewriting the function representing the scan for each node. In the present embodiment, this function is called an ExecuteNode function, and the algorithm is shown in Algorithm 4. FIG. 10 is a diagram showing Algorithm 4. Hereinafter, the algorithm related to Algorithm 4 and the data structure will be described in detail.

[5.1. Tuple Cache]

In the present embodiment, a tuple cache exists as a data structure for holding the execution result of the common partial plan tree. Therefore, cache replacement based on the tuple cache, the function related thereto, and the LFU policy will be described. This is related to a PutTuple function that inserts a tuple into the tuple cache, a TryGet function that retrieves the cache from the tuple cache, and a ReleaseCache function that deletes the cache.

Figure 11:
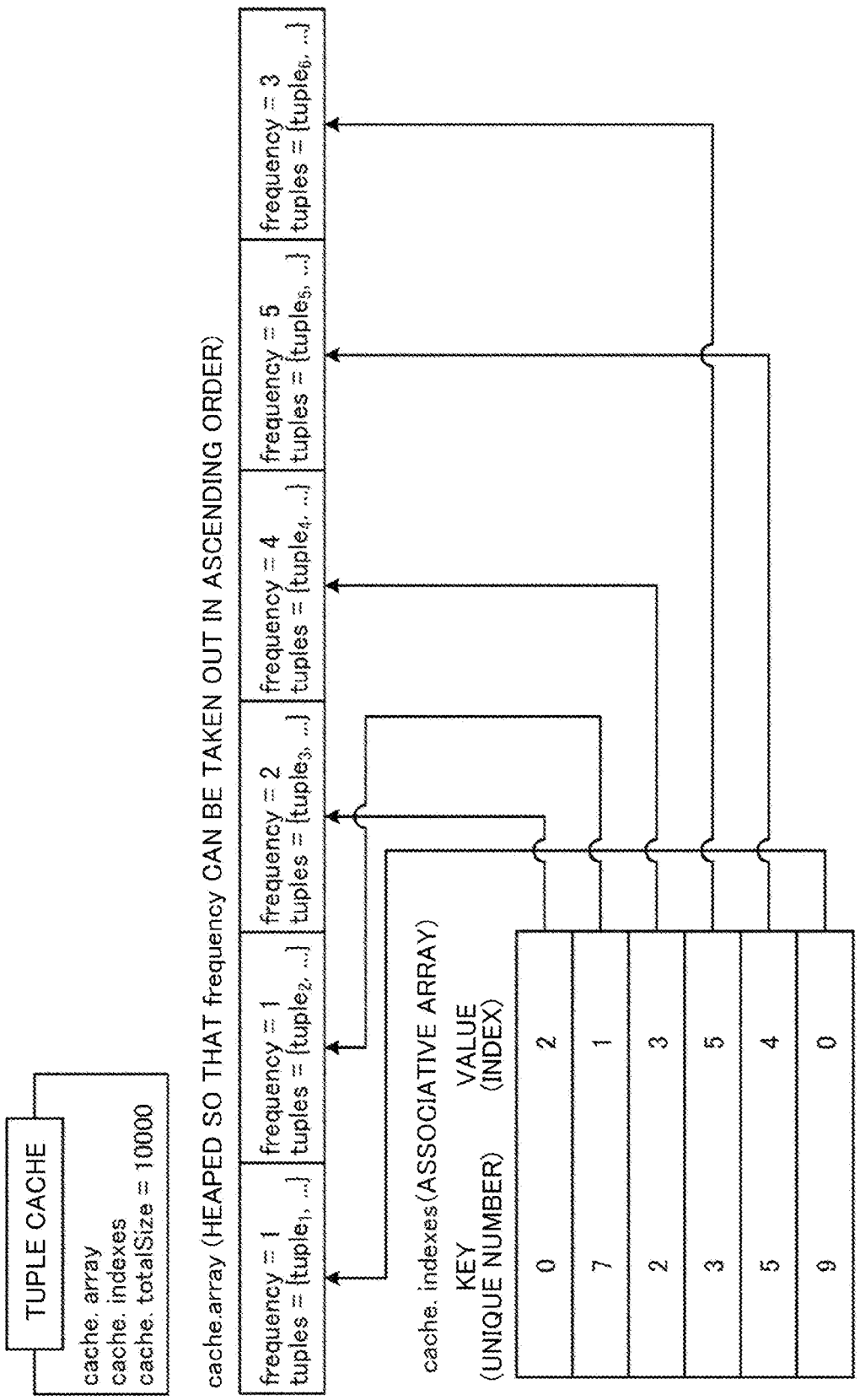
FIG. 11 is a diagram showing an example of a data structure of a tuple cache.

FIG. 11 is a diagram showing an example of the data structure of the tuple cache. The tuple cache (referred to as cache) has an array (cache.array) that holds the cached tuples, an associative array (cache.indexes) whose value is the index in cache.array of the element corresponding to the unique number by using the unique number of the plan tree as the key, and the total size (cache.totalSize) of the currently cached tuples.

Each element of the array (cache.array) has an array (tuples) that holds the entity of the cached tuple and the appearance frequency (frequency) of the plan tree as attributes. The cache.array is heaped, and is configured as a queue with priority capable of acquiring elements in ascending order of appearance frequency, that is, the value of the (frequency) attribute of each element. The cache.indexes is prepared to access elements in the queue with priority (cache.array) from the unique number of the plan tree.

For example, in FIG. 11, six common partial plan trees are cached in the tuple cache. The frequency and the entity (array) of the six common partial plan trees are held in the cache.array. The cache.array is heaped so that the frequency of the leftmost element is reduced.

Under FIG. 11, an associative array (cache.indexes) exists to designate the unique number of the plan tree and access the elements in the cache.array at high speed. In the associative array, indexes for respective unique numbers are held.

The PutTuple function is a function that takes a tuple to be cached with a plan tree and a tuple cache as arguments, and inserts the tuple into the tuple cache. An algorithm for inserting a tuple into the tuple cache is shown in Algorithm 5. FIG. 12 is a diagram showing Algorithm 5.

In the algorithm shown in FIG. 12, it is confirmed whether the same plan tree has been already cached in the tuple cache. To this end, it is confirmed whether the unique number e.id of the plan tree e exists as a key in cache.indexes.

If e.id exists, the cache of the unique number exists in the queue with priority, so that the tuple is added by accessing the cache. On the other hand, if e.id does not exist, a new element is added to cache.array. This element is a tuple which is currently to be cached by tuples, and is initialized with a frequency of 1. After the addition of the element, the contents of cache.array and cache.indexes are operated to heap so that the cache.array becomes a heap. Finally, the total size of the tuples, that is, cache.totalSize is increased by the size of the cached tuples. The value to be increased at this time is a value obtained by multiplying the number of bytes per tuple by the number of rows of the cached tuple.

Subsequently, the TryGet function will be described. This TryGet function is a function that takes a plan tree, an index, and a tuple cache as arguments and returns a tuple of the given index if the result of the plan tree is cached. The algorithm of this TryGet function is shown in Algorithm 6. FIG. 13 is a diagram showing Algorithm 6.

In Algorithm 6, the value is acquired from cache.indexes of the tuple cache by using the unique number of the plan tree as a key. If a value exists, the value indicates an index in cache.array, so that the corresponding element is acquired from cache.array, and a set of tuple and true of the index given as an argument is returned. On the other hand, if the value does not exist, (false, null) is returned.

The ReleaseCache function is a function that takes the node e as an argument and returns a truth value of true or false. The ReleaseCache function acquires the appearance frequency of the node e from the associative array, and then deletes the cache result of the common partial plan tree whose frequency is equal to or less than this appearance frequency. However, the deletion is terminated when the free capacity of the memory reaches the size of the execution result of the node e. Here, the size of the execution result of the node e uses the estimation result by the planner of the database. An algorithm for deleting unnecessary caches from the tuple is shown in Algorithm 7. FIG. 14 is a diagram showing Algorithm 7.

As shown in Algorithm 7, the ReleaseCache function first takes out the leading elements one by one from the cache.array as the queue with priority. When the appearance frequency of the ReleaseCache function is equal to or less than the appearance frequency of the plan tree currently being inserted and there is not enough free space in memory to cache the plan tree currently being inserted, the ReleaseCache function deletes the cache and releases the memory space.

Thereafter, the ReleaseCache function removes the elements deleted from cache.array and heaps this array. Then, the ReleaseCache function subtracts the size of the deleted tuple from the total size of the tuple (cache.totalSize). The ReleaseCache function repeats this operation, determines whether the appearance frequency of the leading element of the queue with priority cache.array exceeds the appearance frequency of the given plan tree, and terminates the operation when the free capacity of the memory is sufficiently secured to cache the plan tree. The ReleaseCache function returns true if a sufficient memory space is finally secured, and returns false if not.

An IncrementCount function is a function that takes the plan tree e and a tuple cache as arguments and increments the appearance frequency of the cache indicating the unique number of the plan tree e by one. An algorithm for incrementing the appearance frequency of the plan tree by one is shown in Algorithm 8. FIG. 15 is a diagram showing Algorithm 8.

As shown in FIG. 15, the IncrementCount function acquires, from cache.indexes, which index the cache of the unique number exists in cache.array, and increments the frequency attribute by one by accessing the index.

[5.2. ExecuteNode Function that Executes Node in Plan Tree and Returns Result]

Subsequently, the ExecuteNode function (Algorithm 4 (see FIG. 10)) that executes each node of the plan tree and returns a tuple as a result thereof will be described.

The ExecuteNode function utilizes the tuple cache described above and the related PutTuple, TryGet, ReleaseCache, and IncrementCount functions. The ExecuteNode function is a function that takes the node e of the plan tree as an argument and returns the tuple of the execution result.

First, in Algorithm 4, it is confirmed whether the result of the node e currently being executed is cached in the tuple cache. To this end, the TryGet function is called. If the first element of the pair of return values of the TryGet function is true, the cached tuple is acquired, so that the index is incremented by one, the tuple stored in the second element is returned, and ExecuteNode is terminated. However, if the index is 0, the cache is newly accessed, so that the IncrementCount function is called to increment the frequency of appearance by one.

On the other hand, if the first element is false, the execution result of the node is not cached, so that it is necessary to execute the execution. However, before execution, the ExecuteNode function refers to an eof attribute of the node e to make sure that the execution of node e is completely finished and there are no remaining tuples. This attribute becomes true when the execution of the node e is completely finished.

If the eof attribute is true, the ExecuteNode function returns null. If the eof attribute is false, the tuple to be executed remains, so that the ExecuteNode function moves to the execution.

Subsequently, the ExecuteNode function acquires the frequency of appearance of the node e, and determines whether the frequency is less than the appearance frequency threshold. If the frequency is less than the appearance frequency threshold, the node is not cached but executed as usual, and the result is returned.

On the other hand, if the frequency is equal to or greater than the appearance frequency threshold, caching may be performed. First, the ReleaseCache function is called, and an unnecessary one of the already cached common partial plan trees is deleted to secure a free space of the memory. However, when the value of e.index is larger than 0, this operation has been already performed, so that the call of the ReleaseCache function to be described later is not performed, and the same operation as when the return value of the ReleaseCache function is true is performed.

If the ReleaseCache function is called and its return value is false, no sufficient free space exists in the memory and the node e cannot be cached, so that the node e is executed as usual and the result is returned.

On the other hand, if the return value of the ReleaseCache function is true, the execution result is cached. First, the node e is executed, and the result is stored in a variable (result). Here, if result is null, execution has been completely finished, so that the null is returned with the e.eof attribute set to true. On the other hand, if the result is not null, the result is inserted into the tuple cache by the PutTuple function. Then, the index (index) of the tuple to be read next is incremented by one, and the execution result (result) is returned. The above is the algorithm of the ExecuteNode function.

[6. Processing Procedure of Execution Processing]

Figure 16:
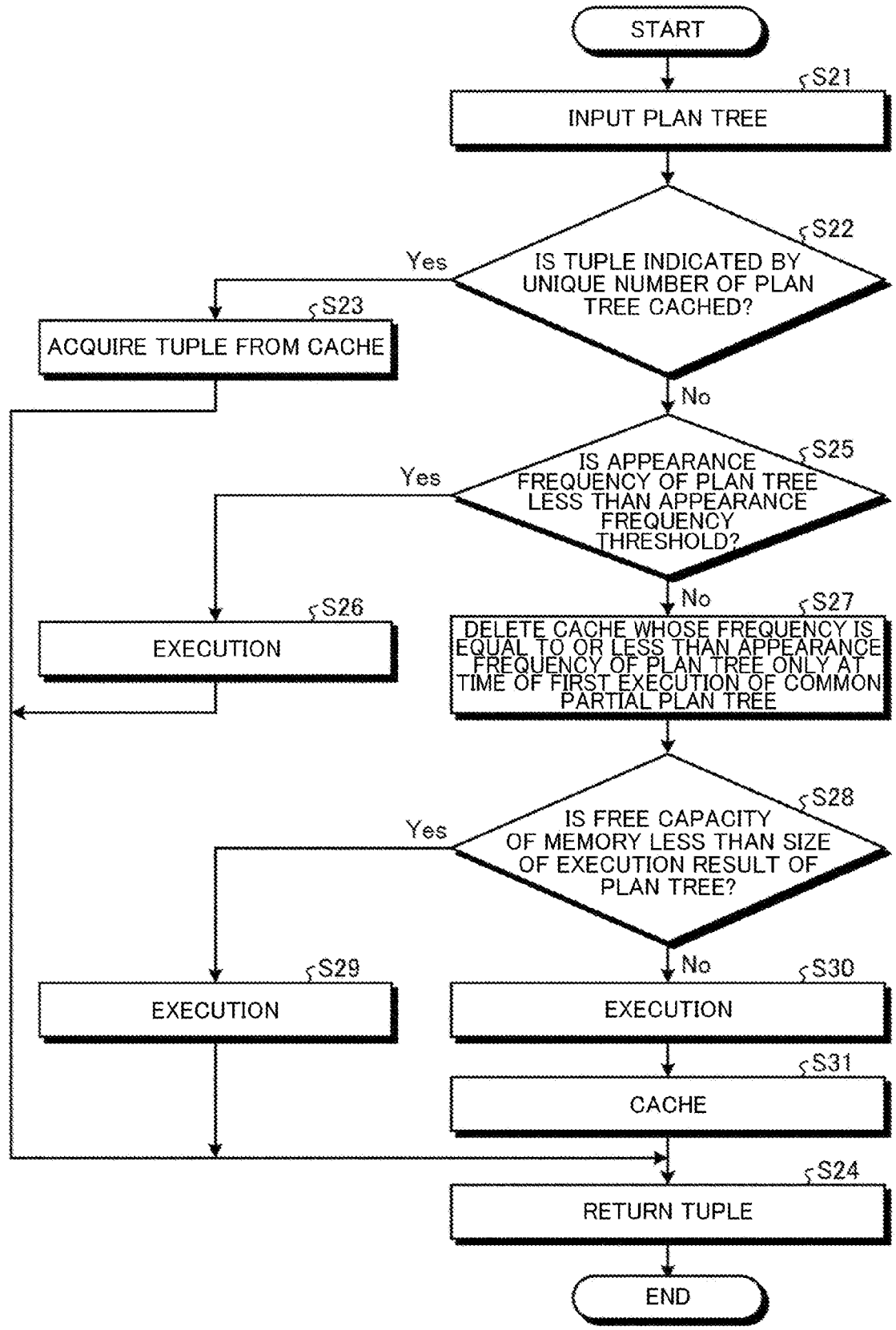
FIG. 16 is a flowchart showing a processing procedure of execution processing of a plan tree by an executor.

FIG. 16 is a flowchart showing a processing procedure of execution processing of the plan tree by the executor 20. The executor 20 executes the plan tree using the above Algorithms 1 to 8 and returns a result.

First, when the input of the plan tree is received in the execution processing of the plan tree (step S21), the executor 20 determines whether the tuple indicated by the unique number of the plan tree is cached with reference to the recording unit 21 (step S22).

When the tuple indicated by the unique number of the plan tree is cached (step S22: Yes), the cache reuse unit 25 acquires the tuple from the cache (step S23) and returns the tuple (step S24).

On the other hand, when the tuple indicated by the unique number of the plan tree is not cached (step S22: No), the executor 20 determines whether the appearance frequency of the plan tree is less than the appearance frequency threshold value (step S25).

When the appearance frequency of the plan tree is less than the appearance frequency threshold (step S25: Yes), the executor 20 executes the plan tree (step S26) and returns a tuple (step S24).

On the other hand, when the appearance frequency of the plan tree is not less than the appearance frequency threshold (step S25: No), in other words, when the appearance frequency of the plan tree is equal to or greater than the appearance frequency threshold, the cache replacement unit 24 deletes a cache whose frequency is equal to or less than the appearance frequency of the plan tree only at the time of the first execution of the common partial plan tree (step S27). Then, the executor 20 determines whether the free capacity of the memory is less than the size of the execution result of the plan tree (step S28).

When the free capacity of the memory is less than the size of the execution result of the plan tree (step S28: Yes), the executor 20 executes the plan tree (step S29) and returns a tuple (step S24). Further, when the free capacity of the memory is not less than the size of the execution result of the plan tree (step S28: No), the executor 20 executes the plan tree (step S30), the plan tree cache processing unit 22 caches the plan tree (step S31), and then returns a tuple (step S24).

[7. Effect of Embodiment]

Thus, in the present embodiment, as a history of a plan tree of each issued query, an execution result of the plan tree, a history of a unique number assigned to each node of the plan tree, and an appearance frequency at which the plan tree has appeared in the past are recorded. Further, in the present embodiment, a unique number corresponding to the execution plan being executed is obtained, the recorded contents are referred to by using the obtained unique number as a key, and the execution result of the plan tree of the obtained unique number is reused when the obtained unique number exists. Therefore, it is possible to speed up the execution time of all of queries.

Here, in the related art, only queries issued at the same timing can be speeded up, and when applied to queries issued at different times, a waiting time occurs. On the other hand, in the present embodiment, even for such a query, by extracting the common part from the queries issued sporadically at different times and sharing the execution result, it is possible to apply the multiple query optimization method without causing a waiting time.

Thus, in the present embodiment, the query processing can be speeded up in such a situation that an analyst assembles a query through trial and error or repeatedly issues a query while changing a condition part. Therefore, in the present embodiment, it is possible to speed up an analysis system requiring shortening of response time, expand an application range of multiple query optimization, and solve a problem that the degree of freedom of analysis is limited.

In this way, in the present embodiment, by caching the intermediate result of the plan tree in the memory, the sharing and execution can be performed even between queries at different times. Also, in the present embodiment, by providing an appearance frequency threshold which is a threshold to be cached, it is possible for the user to control the cache mechanism, and it can be optimized for both workloads where common parts are easy to arrive and positive caching is effective, and workloads where common parts are not easy to arrive and it is important to suppress unnecessary cache. In the present embodiment, by combining the frequency analysis of the query and the cache algorithm, the preceding query is executed without causing a waiting time, and the speeding-up of the subsequent query is realized.

In the present embodiment, even when the memory space is insufficient for the size of the common partial plan tree, the common partial plan tree which is expected to have a higher possibility of arrival in the future is cached preferentially by the tuple cache mechanism. Further, in the present embodiment, even if the projection operation is different, the common partial plan tree can be cached by the projection operation processing, and the sharing opportunity can be increased.

[About System Configuration of Embodiment]

Each component of the data processing device 100 shown FIG. 1 is functionally conceptual, and does not necessarily have to be physically configured as shown in the figure. That is, a specific form of distribution and integration of the functions of the data processing device 100 is not limited to the shown form, and all or some of the functions can be functionally or physically distributed or integrated in any unit according to various loads, usage conditions, and the like.

Further, each process performed in the data processing device 100 may be realized by a central processing unit (CPU) and a program that is analyzed and executed by the CPU, in whole or in an arbitrary part. Also, each process performed in the data processing device 100 may be realized as hardware through wired logic.

Further, among the processes described in the embodiment, all or some of the processes described as being automatically performed can be performed manually. Alternatively, all or some of the processes described as being manually performed can be automatically performed by a known method. In addition, the above-mentioned and shown processing procedures, control procedures, specific names, and information including various types of data and parameters can be appropriately changed unless otherwise specified.

[Program]

Figure 17:
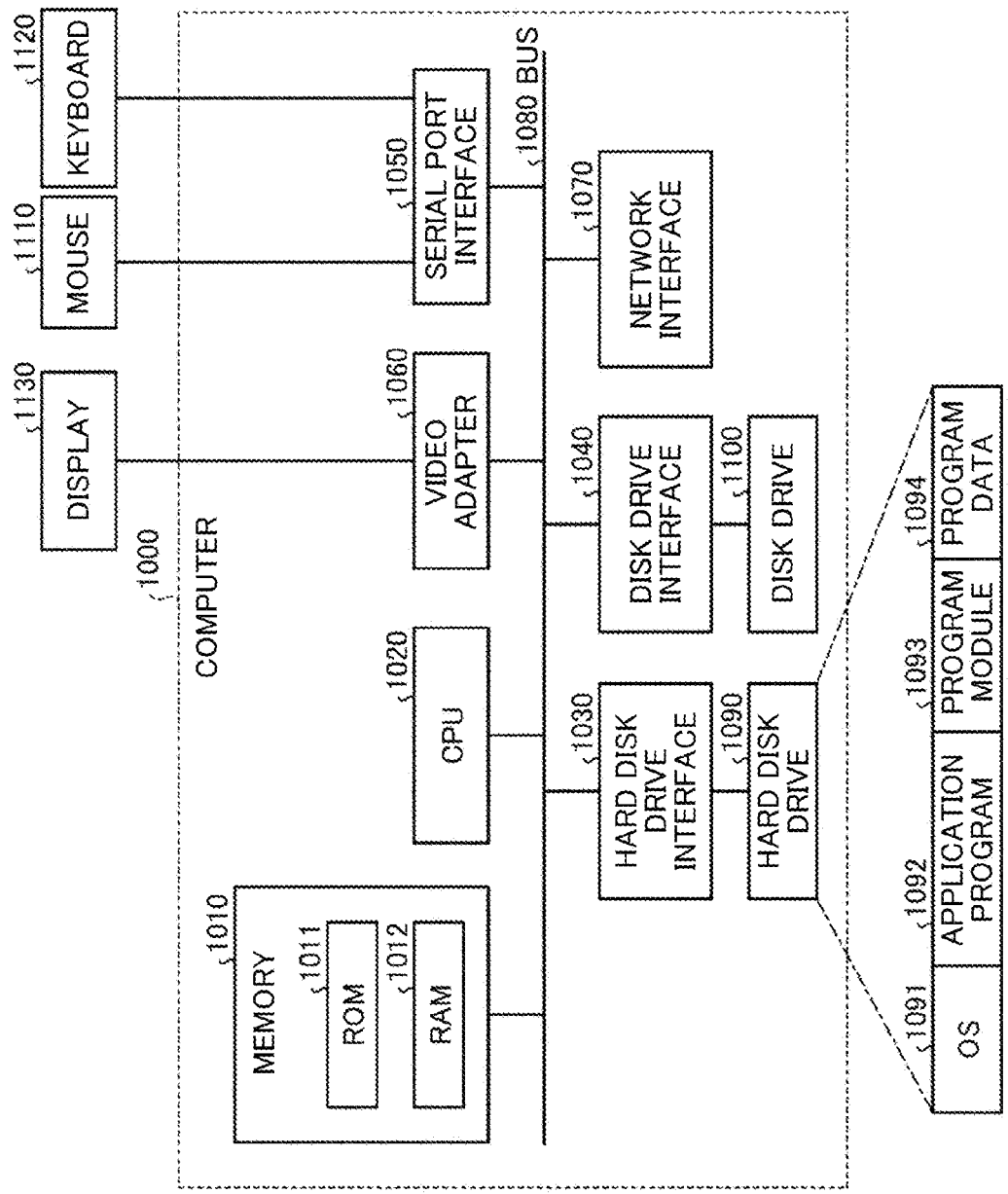
FIG. 17 is a diagram showing an example of a computer in which a data processing device is realized by executing a program.

FIG. 17 is a diagram showing an example of a computer in which the data processing device 100 is realized by executing a program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program, such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines each process of the data processing device 100 is implemented as the program module 1093 in which a code that can be executed by the computer 1000 is described. The program module 1093 is stored in, for example, the hard disk drive 1090. For example, the program module 1093 for executing the same processing as the functional configuration in the data processing device 100 is stored in the hard disk drive 1090. Note that the hard disk drive 1090 may be replaced with a solid state drive (SSD).

Furthermore, the setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 into the RAM 1012 and executes them as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), a wide area network (WAN), and the like). Then, the program module 1093 and the program data 1094 may be read by the CPU 1020 from another computer via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention.

REFERENCE SIGNS LIST

100 Data processing device
10 Extraction unit
20 Executor
21 Recording unit
22 Plan tree cache processing unit
23 Projection operation processing unit
24 Cache replacement unit
25 Cache reuse unit

The invention claimed is:

1. A data processing device comprising a processor configured to execute an operation comprising: memory storing instructions that, when executed by the processor, causes the device to perform a set of operations, the set of operations comprising:
recording, as a history of a plan tree of each issued query, an execution result of the plan tree, a history of specific information for specifying each node of the plan tree, and an appearance frequency at which the plan tree has appeared in a past; and
obtaining specific information corresponding to an execution plan being executed, wherein use of the specific information is associated with:
referring to the history of the plan tree by using the obtained specific information as a key, and
reusing the execution result of the plan tree of the obtained specific information when the obtained specific information exists,
extracting a common partial plan tree, wherein the common partial plan tree includes a common part of each plan tree from the plan tree of each issued query,
assigning specific information to each node of the common partial plan tree,
referring to the history and the appearance frequency of the specific information, and
caching the common partial plan tree, wherein the common partial plan tree has appeared a number of times equal to or greater than a predetermined appearance frequency threshold among a plurality of common partial plan trees.

2. The data processing device according to claim 1, wherein the caching of the common partial plan tree further comprises determining a number of common partial plan trees in the plurality of common partial plan trees to be cached based on a change in a value of the predetermined appearance frequency threshold.

3. The data processing device according to claim 1, the processor further configured to execute an operation comprising:
rewriting and caching the plan tree so that all columns output by an operation of the common partial plan tree appear as a result.

4. The data processing device according to claim 1, wherein the specific information is associated with a node of the plan tree.

5. The data processing device according to claim 1, wherein the plan tree represents a tree structure of data representing the execution plan of a query.

6. The data processing device according to claim 1, the processor further configured to execute an operation comprising:
rewriting and caching the plan tree so that columns output by an operation of the common partial plan tree appear as a result.

7. A data processing method, comprising:
recording, as a history of a plan tree of each issued query, an execution result of the plan tree, a history of specific information for specifying each node of the plan tree, and an appearance frequency at which the plan tree has appeared in a past; and
obtaining specific information corresponding to an execution plan being executed, wherein use of the specific information is associated with:
referring to the history of the plan tree by using the obtained specific information as a key, and
reusing the execution result of the plan tree of the obtained specific information when the obtained specific information exists, extracting a common partial plan tree, wherein the common partial plan tree includes a common part of each plan tree from the plan tree of each issued query, assigning specific information to each node of the common partial plan tree, referring to the history and the appearance frequency of the specific information, and caching the common partial plan tree, wherein the common partial plan tree has appeared a number of times equal to or greater than a predetermined appearance frequency threshold among a plurality of common partial plan trees.

8. The data processing method according to claim 7, wherein the caching of the common partial plan tree further comprises determining a number of the plurality of common partial plan trees to be cached based on a change in a value of the predetermined appearance frequency threshold.

9. The data processing method according to claim 7, further comprising:

rewriting and caching the plan tree so that all columns output by an operation of the common partial plan tree appear as a result.

10. The data processing method according to claim 7, wherein the specific information is associated with a node of the plan tree.

11. The data processing method according to claim 7, wherein the plan tree represents a tree structure of data representing the execution plan of a query.

12. A computer-readable non-transitory recording medium storing computer-executable data processing program that when executed by a processor cause a computer system to execute an operation comprising:

recording, as a history of a plan tree of each issued query, an execution result of the plan tree, a history of specific information assigned to each node of the plan tree, and an appearance frequency at which the plan tree has appeared in a past; and obtaining specific information corresponding to an execution plan being executed, wherein use of the specific information is associated with:

referring to the history of the plan tree by using the obtained specific information as a key, and reusing the execution result of the plan tree of the obtained specific information when the obtained specific information exists, extracting a common partial plan tree, wherein the common partial plan tree includes a common part of each plan tree from the plan tree of each issued query, assigning specific information to each node of the common partial plan tree, referring to the history and the appearance frequency of the specific information, and caching the common partial plan tree, wherein the common partial plan tree has appeared a number of times equal to or greater than a predetermined appearance frequency threshold among a plurality of common partial plan trees.

13. The computer-readable non-transitory recording medium according to claim 12, wherein the caching of the common partial plan tree further comprises determining a number of the plurality of common partial plan trees to be cached based on a change in the value of the predetermined appearance frequency threshold.

14. The computer-readable non-transitory recording medium according to claim 12, the computer-executable program instructions when executed further causing the computer system to execute an operation comprising:

rewriting and caching the plan tree so that all columns output by an operation of the common partial plan tree appear as a result.

* * * * *